T. R. McKNIGHT.
GRADING MACHINE.
APPLICATION FILED JULY 6, 1915.
1,329,669.
Patented Feb. 3, 1920.
4 SHEETS—SHEET 1.
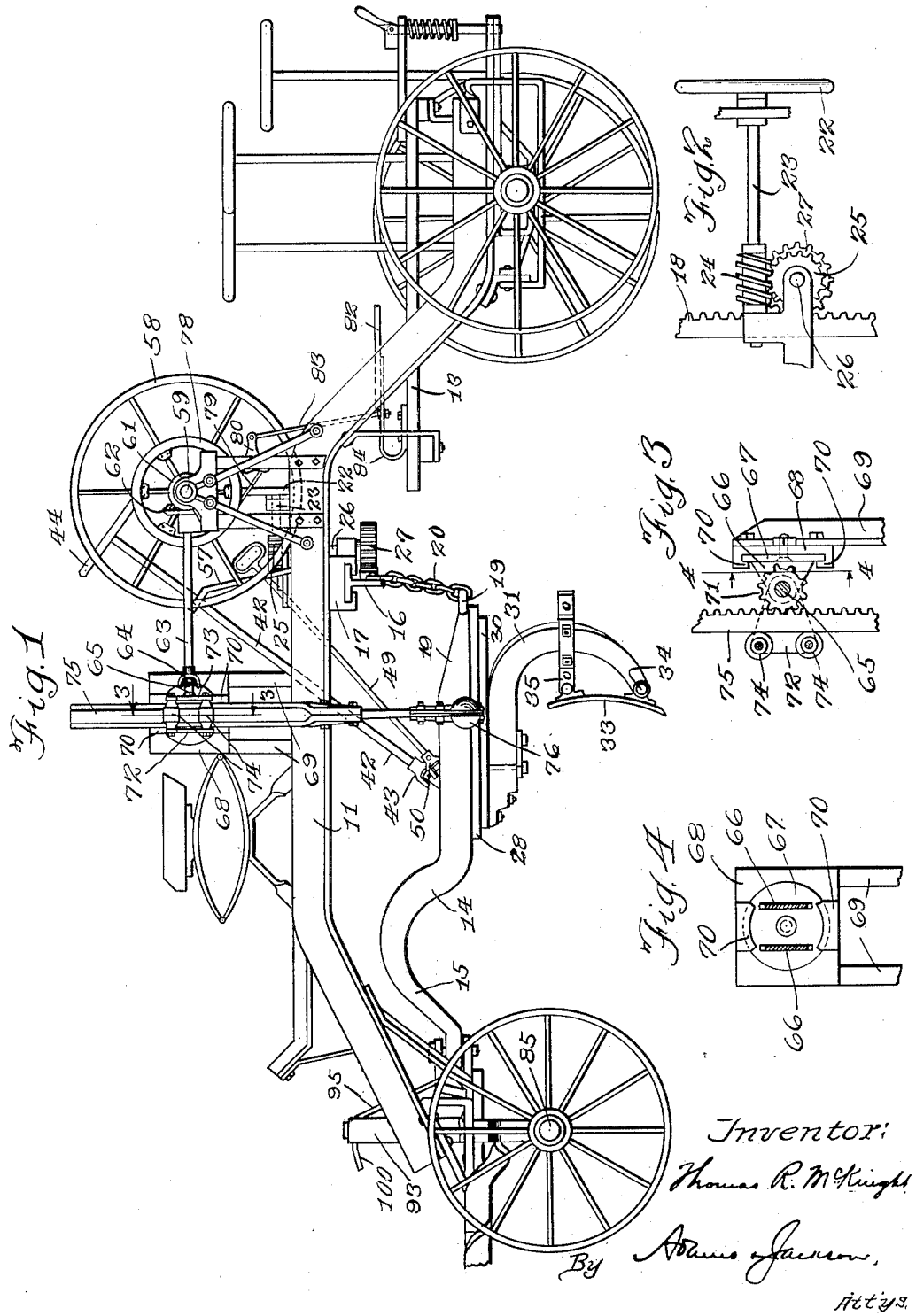

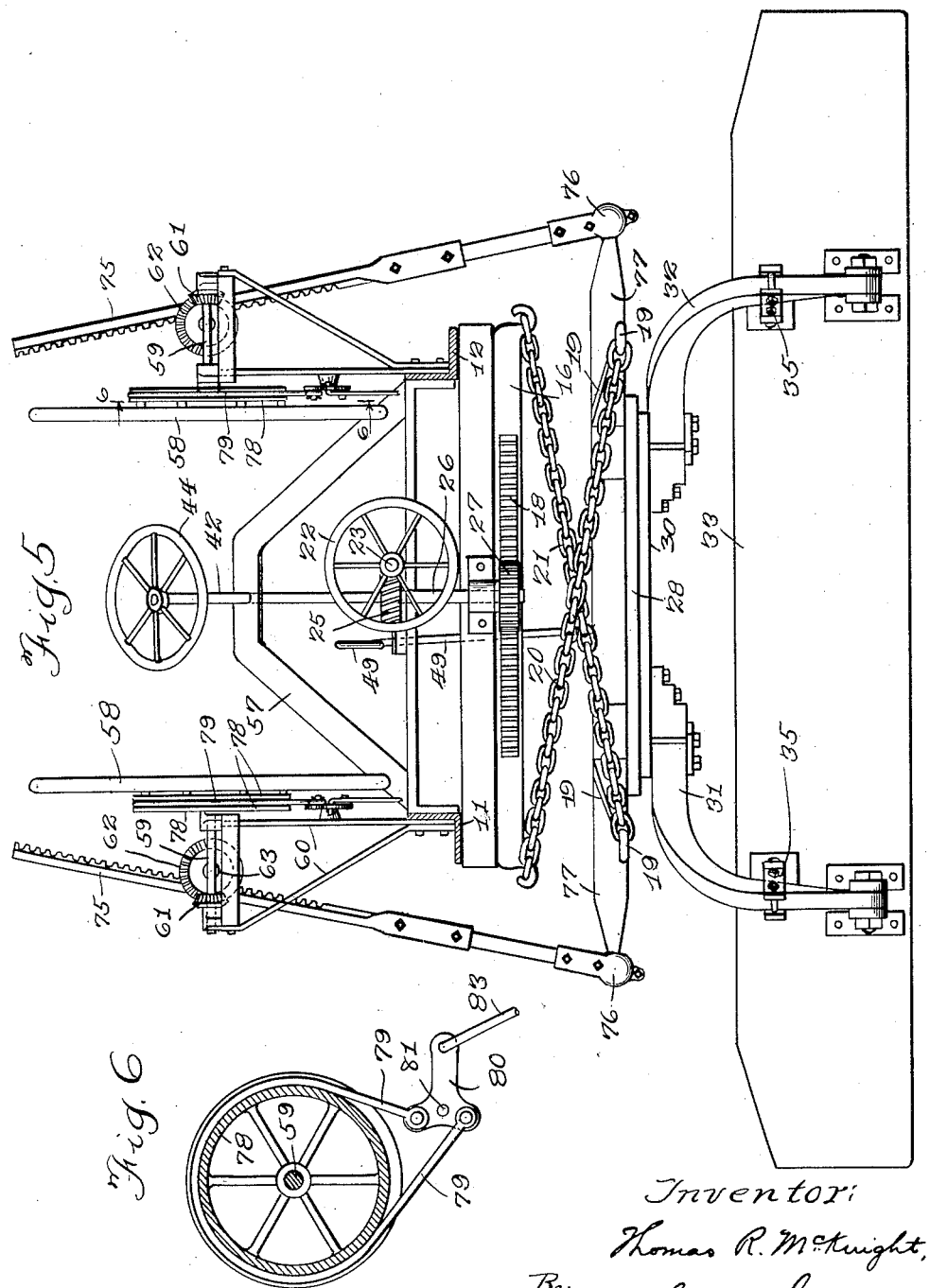

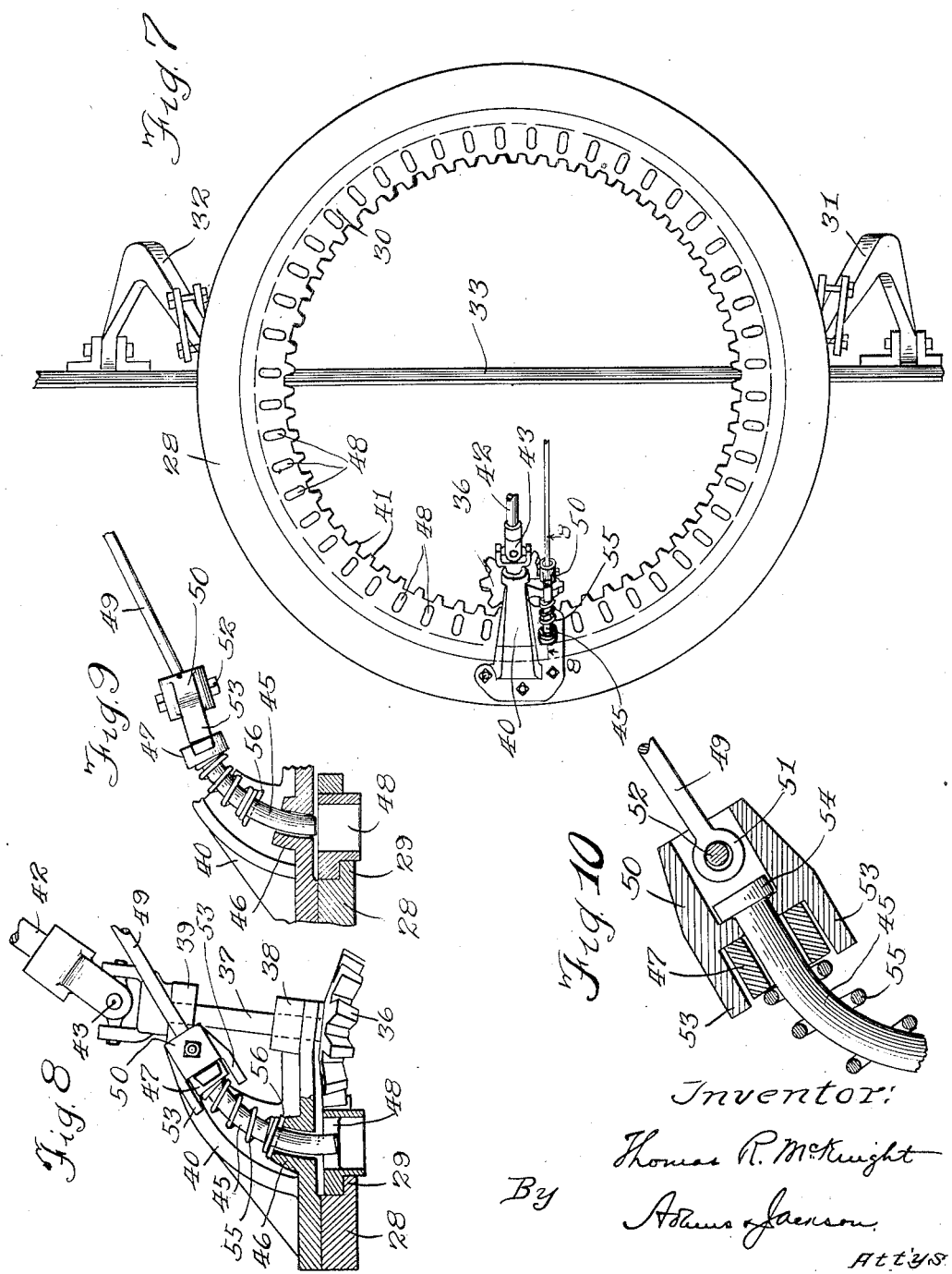

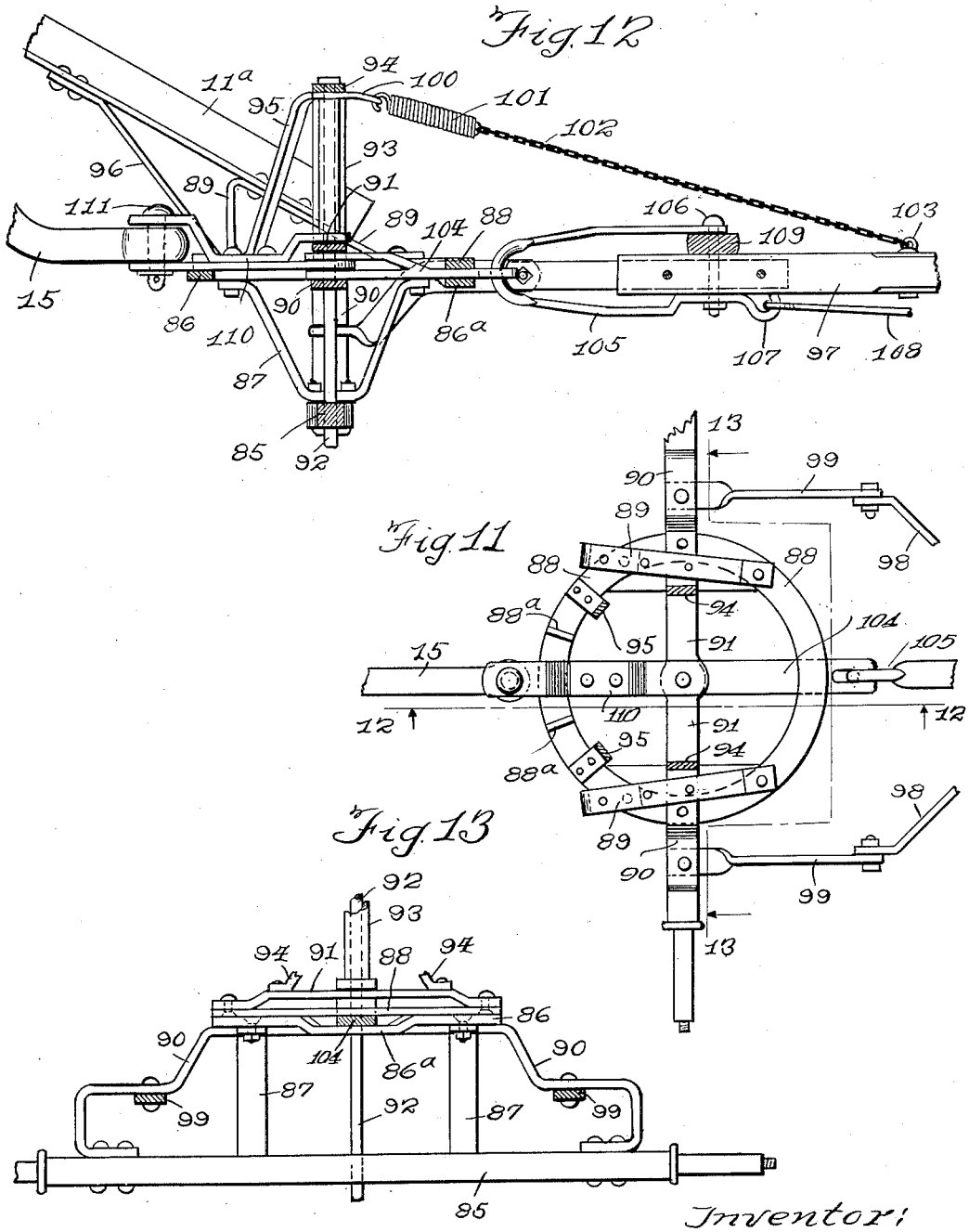

UNITED STATES PATENT OFFICE.

THOMAS R. McKNIGHT, OF AURORA, ILLINOIS, ASSIGNOR TO WESTERN WHEELED SCRAPER COMPANY, OF AURORA, ILLINOIS, A CORPORATION OF ILLINOIS.

GRADING-MACHINE.

1,329,669.   Specification of Letters Patent.   Patented Feb. 3, 1920.

Application filed July 6, 1915. Serial No. 38,240.

*To all whom it may concern:*

Be it known that I, THOMAS R. MCKNIGHT, a citizen of the United States, and a resident of Aurora, in the county of Kane and State of Illinois, have invented certain new and useful Improvements in Grading-Machines, of which the following is a specification, reference being had to the accompanying drawings.

My invention relates to grading machines and has to do with that type of machine in which a transversely-disposed scraper is carried by a scraper-supporting frame suspended intermediately under a four-wheeled carriage. In machines of that type provision is made for swinging the scraper-supporting frame transversely; for raising and lowering it, and securing it at different heights; and for angularly adjusting the scraper, and securing it in different positions of adjustment, and my present invention has for its object to provide certain improvements in the mechanism by which these different adjustments or operations are effected. I accomplish my object as illustrated in the drawings and as hereinafter described. That which I believe to be new is set forth in the claims.

In the accompanying drawings,—

Figure 1 is a side elevation of my improved grading machine;

Fig. 2 is a detail, being a partial plan view showing certain parts of the mechanism by which the scraper-supporting frame is shifted transversely of the carriage;

Fig. 3 is a detail, being a vertical section on line 3—3 of Fig. 1;

Fig. 4 is a vertical cross-section on line 4—4 of Fig. 3;

Fig. 5 is an enlarged vertical cross-section substantially on line 5—5 of Fig. 1;

Fig. 6 is a vertical section on line 6—6 of Fig. 5, showing the brake-wheel and brake-band;

Fig. 7 is a plan view illustrating the rotary scraper supporting devices and the locking mechanism therefor;

Fig. 8 is an enlarged vertical sectional view substantially on line 8—8 of Fig. 7 showing the devices for adjusting the angular position of the scraper, the locking devices being shown in operative position;

Fig. 9 is a similar view of the locking devices, showing them in inoperative position;

Fig. 10 is an enlarged sectional view showing the construction of the upper part of the locking mechanism shown in Figs. 8 and 9;

Fig. 11 is a partial plan view of the front part of the machine, illustrating my improved draft connections;

Fig. 12 is a longitudinal section on line 12—12 of Fig. 11; and

Fig. 13 is a cross-section on line 13—13 of Fig. 11.

Referring to the drawings,—

11—12 indicate the side members or bars of the carriage frame, which are preferably in the form of angle-irons arched intermediately so that the intermediate portion of the carriage frame is higher than the end portions thereof. These side bars are suitably secured together by cross-braces, and the carriage frame is mounted on suitable running gear, which so far as it has to do with my present invention, will be hereinafter described. 13 indicates a rear platform on which the operator stands, as usual. 14 indicates a scraper-supporting frame, which is of the usual bifurcated form shown, for example, in my pending application Serial No. 852,010, filed July 20, 1914, and is bent in the form of a goose neck 15. The arrangement by which the goose neck is connected with the draft devices will be hereinafter described. The scraper-supporting frame 14 is adapted to swing laterally about the front pivot of the goose neck, and is supported at the rear by a cross-bar 16, preferably T-shaped and arranged to slide in suitable bearings in a beam 17 secured to the carriage frame. The bar 16 carries a rack 18, and its ends are connected with the rear end portions of arms 19, secured to the rear portion of the scraper-supporting frame 14, by crossed chains 20—21, as shown in Fig. 5. The arrangement is such that movement of the cross-bar 16 to the left, for example, will swing the rear portion of the scraper-supporting frame 14 in the same direction, and vice versa. The bar 16 is moved endwise by means of a hand-wheel 22 carried by a horizontal shaft 23 which carries a worm 24 meshing with a worm-wheel 25 mounted on a shaft 26. As shown in Fig. 2, this shaft also carries a pinion 27 which meshes with the racks 18. These parts are mounted on the carriage in any suitable way.

28 indicates an annular frame having an inwardly-projecting lip 29, as best shown in Figs. 8 and 9, which frame in the construction shown is secured to the under side of the scraper-supporting frame 14. The lip 29 supports a ring-plate 30 which is adapted to rotate thereupon and has connected to it at the under side beams 31—32 by which the scraper-blade 33 is carried. As shown in Fig. 1, the scraper-blade is preferably pivotally connected to the beams 31—32 near its lower margin by pivots 34, and is adjustably connected to said beams near its upper margin by bars 35, so that the pitch of the blade may be adjusted. It will be obvious that by rotating the ring-plate 30 the angular position of the scraper with reference to the line of draft may be varied. Said ring-plate is rotated for this purpose by means of a pinion 36 which is mounted upon the lower end portion of a shaft 37 fitted in suitable bearings 38—39 in a bracket 40 which is mounted upon and secured to the annular frame 28, as best shown in Figs. 7 and 8. This pinion 36 meshes with a curved rack 41 provided at the inner margin of the ring-plate 30, as best shown in Fig. 7, so that by rotating the shaft 37 the ring-plate 30 may be rotated through any desired arc. The shaft 37 is rotated by means of a hand-operated rod 42, which extends up to a point within convenient reach of the operator, its lower end being connected with the shaft 37 by a universal coupling 43, as best shown in Fig. 8. Preferably, said rod 42 is provided with a hand-wheel 44 for convenience in rotating it.

The scraper is locked at different angles to the line of draft by means of a locking-pin 45 which, as shown in Figs. 8 and 9, is curved and is fitted to move longitudinally in suitable bearings 46—47 provided in the bracket 40. The lower end of said locking-pin is adapted to enter any of a series of holes 48 provided in the ring-plate 30 adjacent to the rack 41, so that, as shown in Fig. 8, when the locking-pin 45 is in its lowermost position, its lower end lies in one of the holes 48 and holds the scraper in a fixed angular position to the line of draft. When it is desired to change the angular position of the scraper, the pin 45 is drawn up out of engagement with the ring-plate 30 to the position shown in Fig. 9 by means of a rod 49 which extends up to a point in convenient reach of the operator, as shown in Fig. 1. The lower end of said rod is connected by a coupling 50 with the locking-pin 45 preferably in the manner shown in Fig. 10. As therein illustrated, the rod 49 is provided at its lower end with an eye 51 through which passes a pin 52 secured to the coupling 50. The latter has two downwardly-projecting lips 53 at diametrically-opposite points, which, when turned to the position shown in Fig. 10, lie at opposite sides of the bearing 47, but when the coupling 50 is drawn out to the position shown in Fig. 9 and turned through an angle of ninety degrees, the lips 53 then bear upon the upper face of the bearing 47, as shown in said figure, thus holding the pin 45 in its elevated position. The coupling 50 is rotatably connected with the pin 45 by providing said pin with a head 54 at its upper end, which lies in a recess provided for that purpose in the coupling 50, the body of the pin passing through a suitable perforation at the bottom of said recess, as shown in Fig. 10. 55 indicates a spring, which is mounted upon the pin 45 between the bearing 47 and a pin 56 carried intermediately by the pin 45. It will thus be seen that by pulling up on the rod 49 the pin 45 may be withdrawn from engagement with the ring-plate 30, thereby compressing the spring 55. When the pin is wholly withdrawn, by giving the coupling 50 a quarter turn, its lips 53 will engage the upper bearing 47 and hold the pin 45 in inoperative position. The scraper-blade may then be adjusted angularly by rotating the shaft or rod 42, and when the desired adjustment has been made, the scraper may be locked in its new position, by simply giving the rod 49 another quarter turn, when the spring 55 will move the locking-pin down into one of the holes 48 of the ring-plate. The upper portion of the shaft 42 is preferably supported by a bracket 57 mounted on the frame of the machine, as shown in Fig. 1, and if desired, a similar support may be provided for the rod 49.

The rear portion of the scraper-supporting frame is raised and lowered to raise or lower the scraper horizontally, or to raise or lower either end thereof, by means of hand-wheels 58, one of which is provided at each side of the machine, as is usual. As the hand-wheels and their connections at each side of the machine are alike, the same reference numerals will be employed to designate corresponding parts of each set. As best shown in Fig. 5, each hand-wheel 58 is mounted upon a short transverse shaft 59 mounted in suitable bearings carried by supports 60 secured to the machine frame in any suitable way. The shaft 59 carries a beveled pinion 61 which meshes with a beveled gear 62 mounted upon a longitudinally-extending shaft 63, as best shown in Fig. 1. The latter shaft has at its forward end a universal coupling 64 by which it is connected with a short shaft 65 mounted in standards 66 carried by a disk-like base 67. These parts are best shown in Figs. 3 and 4. The base 67 is rotatably mounted upon a vertical plate 68 secured at the side of the machine frame, preferably upon standards 69, as shown in Fig. 4, and is provided with grooved guides 70 which hold it in place but permit it to rotate to a greater or less extent. 71 indicates a pinion mounted on the shaft 65 and keyed thereto. 72–73 indicate two parallel triangular plates which are secured upon the shaft 65 at opposite sides of the pinion 71, which is at one of the angles of the triangle, as shown in Fig. 3. 74 indicates rollers carried at the other angles of said triangular plates. 75 indicates a rack-bar which extends between the rollers 74 and the pinion 71, said rack-bar meshing with said pinion so that by rotating said pinion the rack-bar may be moved endwise. As best shown in Fig. 5, the rack-bars 75 at opposite sides of the machine are rigid from end to end and extend downward and outward, their lower ends being connected by globular bearings 76, or other suitable connections, to the end portions of transverse arms 77 connected to the scraper supporting frame 14 and to the annular frame 28. It will be apparent from the foregoing description that by rotating one or the other of the hand-wheels 58 the rack-bar 75 connected with it through the intermediate mechanism described, may be moved endwise to raise or lower that side of the scraper-supporting frame with which said rack-bar is connected, correspondingly raising or lowering one end of the scraper. By using rigid continuous rack-bars as shown the scraper is positively held down to its work, but its freedom of adjustment is not interfered with since, as described, said rack-bars may be swung laterally or longitudinally of the machine as required to permit the several adjustments of the scraper.

The hand-wheels 58 and their shafts 59 are held normally against rotation by suitable brake mechanism, comprising a brake-wheel 78 secured to the outer face of each hand-wheel, concentrically therewith, or upon the shaft 59 upon which said hand-wheel is mounted, as shown in Fig. 6. A brake-band 79 extends around the brake-wheel and is connected with a three-armed lever 80 pivoted at 81 to any suitable support and connected with a foot-lever 92 on the platform 13 by means of a connecting-rod 83, best shown in Fig. 1. The foot-lever 82 has a spring-portion 84 which normally holds it up and holds the brake-band in operative engagement with the brake-wheel, so that the operator must depress the foot-lever 82 to release the hand-wheel with which it is associated. In order to prevent the brake-band from slipping off the brake-wheel, and also to increase its efficiency, the brake-wheel is grooved as shown in Figs. 5 and 6.

As has been suggested, the draft is transmitted directly to the goose neck 15 of the scraper-supporting frame so that there is no strain upon the frame of the machine. This is accomplished by the construction shown in Figs. 11 to 13, inclusive. Referring to said figures, 85 indicates the front axle, upon which is mounted the lower member 86 of a fifth wheel, by means of brackets 87. The front portion of the fifth wheel member 86 is offset, as shown at 86ª in Fig. 13. 88 indicates the upper member of the fifth wheel, which carries brackets 89 to which are secured the forward ends of the main frame 11, which are inclined downward as shown at 11ª in Fig. 12. As best shown in Fig. 11, the upper fifth wheel member 88 is not a complete circle, its rear ends being spaced a short distance apart and being bent up as shown at 88ª in Fig. 11 to form stops. 90 indicates a bolster, which is secured upon the front axle 85, its central portion extending longitudinally of the axle under the lower fifth wheel member 86, as shown in Fig. 12. 91 indicates a cross-bar, which is connected with the upper fifth wheel member 88 and extends transversely of the machine over the central portion of the bolster 90, as best shown in Figs. 12 and 13. 92 indicates a king-bolt, which extends down through the bar 91, the bolster 90 and the central portion of the axle 85. The upper portion of the king-bolt is inclosed by a sleeve 93 over the upper end of which passes an upper bolster 94, the ends of which are secured to the cross-bar 91. This bolster is braced by braces 95, the lower ends of which are secured to the upper fifth wheel member 88. 96 indicates braces, which extend down from the forward ends 11ª of the frame of the machine and are also secured to the upper member of the fifth wheel. 97 indicates the tongue, which is secured by braces 98 to tongue-irons 99 projecting forward from and secured to the bolster 90, as shown in Figs. 11 and 13. 100 indicates a tongue-support, which fits upon the king-bolt 92, preferably between the bolster 94 and the sleeve 93 and is connected to the tongue by a spring 101, a chain 102 and a bolt 103, as shown in Fig. 12, thus providing a yielding support for the forward end of the tongue. 104 indicates a draft fork, the forward portion of which passes between the upper fifth wheel member 88 and the offset portion 86ª of the lower fifth wheel member 86 as shown in Fig. 12, its bifurcated rear portion being pivoted upon the king-bolt 92. Thus, this draft fork may swing horizontally about the king-bolt as an axis. The forward end of the draft fork is perforated to receive a U-shaped hammer-strap 105 pivotally connected by a pin 106 with the tongue and having a hook 107 to which a draft-rod 108 is attached. The hammer-strap 105 is capable of limited longitudinal movement independently of the tongue so that for a purpose hereinafter set forth the draft is not transmitted directly to the tongue. 109 indicates a whiffletree, which is pivoted upon the pin 106 in the usual way. As best shown in Fig. 12, the rear portion of the draft fork 104 extends between the central portion of the bolster 90 and the bar 91. 110 indicates a double-forked draft link, the forward portion of which is pivoted upon the king-bolt 92, its two members extending one between the members of the draft fork 104 and the other between the sleeve 93 and the bar 91. The rear members of the draft link 110 form a fork between which fits the front end of the goose neck 15, which is pivoted to them by a pin 111. By the foregoing construction the draft applied to the hammer-strap 105 is transmitted through the draft fork 104 directly to the king-bolt 92 and through it to the goose neck 15 by means of the draft link 110. Thus no strain of any kind is sustained by the frame of the machine, and the scraper receives the direct pull of the draft. The separated upturned ends 88$^a$ of the upper fifth wheel member 88 permit the draft link 110 to swing horizontally to a limited extent about the king-bolt as an axis, and the draft fork 104 may also swing horizontally in the offset portion 86$^a$ of the lower member 86 of the fifth wheel.

That which I claim as my invention, and desire to secure by Letters Patent, is,—

1. A wheeled-scraper, comprising a carriage, a scraper-supporting frame arranged thereunder, an annular frame mounted on said scraper-supporting frame, a ring-plate rotatably supported by said annular plate, a scraper connected with said ring-plate, said ring-plate having a series of holes, a curved locking-pin supported by said annular frame and movable into said holes for locking said ring-plate against rotation, an endwise movable operating device for pulling said pin endwise out of engagement with said ring-plate, and a coupling connected with said operating device and rotatably connected with said pin, said coupling being adapted to be rotated when the pin is withdrawn from its operative position to lock said pin in such position.

2. In a grading-machine, the combination with an annular frame, a ring-plate rotatably supported thereby, a bracket mounted on said annular frame and having bearings, a locking-pin movable endwise in said bearings into and out of engagement with one or more holes in said ring-plate, an endwise movable rod, a spring for normally holding said pin in engagement with said ring-plate, a coupling connected to said rod and rotatably connected with said pin, said coupling having means adapted to engage said bracket to hold the pin in inoperative position, and a scraper connected with said ring-plate.

3. In a grading-machine, the combination with an annular frame, a ring-plate rotatably supported thereby, a bracket mounted on said annular frame and having bearings, a locking-pin movable endwise in said bearings into and out of engagement with holes in said ring-plate, a rod operatively connected with said pin for moving the same endwise, a spring for normally holding said pin in engagement with said ring-plate, a coupling connected to said rod and pivotally connected with said pin, said coupling having lips adapted to be turned into position to engage portions of said bracket when the pin is in inoperative position, to hold the pin in such position, and a scraper connected with said ring-plate.

THOMAS R. McKNIGHT.